Oct. 11, 1966    T. R. DEMYON    3,277,713
RADIATOR SIGHT GAUGE
Filed Feb. 23, 1965    3 Sheets-Sheet 1

INVENTOR
Thomas R. Demyon

BY *Walter G. Finch*
ATTORNEY

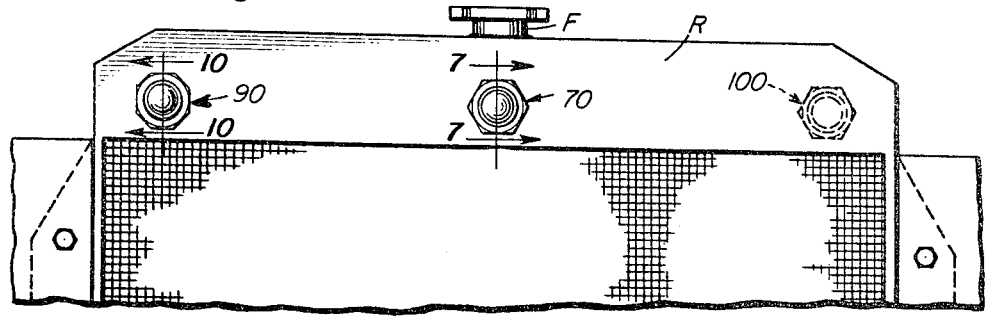
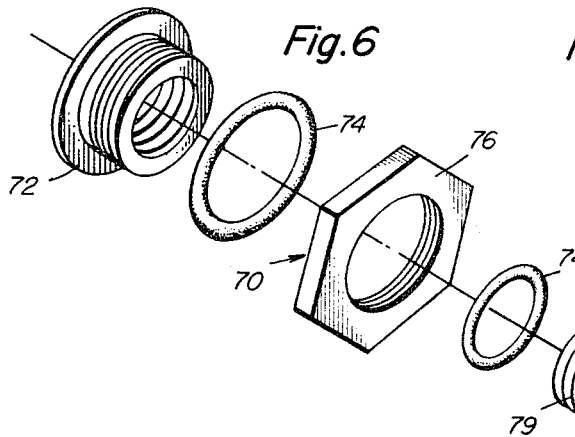
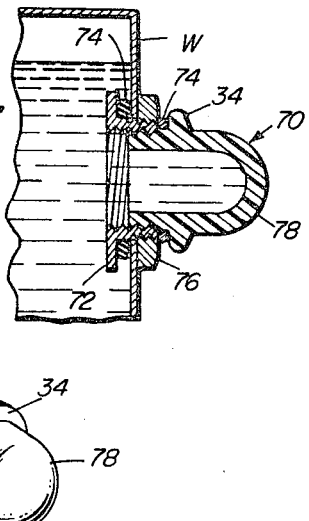
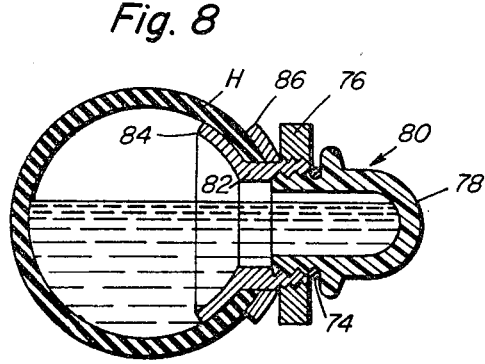
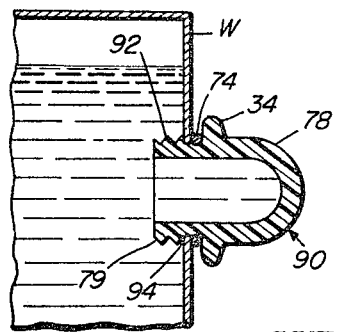

Oct. 11, 1966

T. R. DEMYON 3,277,713

RADIATOR SIGHT GAUGE

Filed Feb. 23, 1965

INVENTOR
*Thomas R. Demyon*

BY *Walter G. Finch*
ATTORNEY

United States Patent Office 3,277,713
Patented Oct. 11, 1966

3,277,713
RADIATOR SIGHT GAUGE
Thomas R. Demyon, 422 E. North Ave., Baltimore, Md.
Filed Feb. 23, 1965, Ser. No. 434,266
2 Claims. (Cl. 73—334)

This application is a continuation-in-part of U.S. patent application Serial No. 387,071, filed August 3, 1964 by Thomas R. Demyon and Jerome M. Lichtenberg for "Radiator Sight Gauge" now U.S. Letters Patent No. 3,248,948 issued May 3, 1966 and U.S. patent application, Serial No. 349,242 filed March 4, 1964 by Thomas R. Demyon for "Radiator Sight Gauge," the last now abandoned. This invention relates generally to indicating devices, and more particularly it pertains to improved sight gauges for viewing the coolant level in motor vehicle radiators and the like.

The present practice of unscrewing the fill cap of a radiator to determine whether the level of cooling fluid is correct, is objectionable, especially because of the present practice of using pressurized systems to allow operation at higher temperatures. Besides being time-consuming when a radiator cap is unscrewed, the release of pressure often causes a sudden and dangerous boil-over. Then, too, there is always the possibility of the cap not being replaced tightly enough to re-seal and this is, therefore, inductive of a future boil-over after driving the vehicle a few miles.

Accordingly, it is an object of the present invention to provide a sight gauge for motor vehicles which allows observation of the fluid level at a glance.

Another object of this invention is to provide a sight gauge in which the gauge window can be removed and replaced readily without tools.

Another object of this invention is to provide a sight gauge which can be installed from the inside of existing radiators with a minimum of trouble.

Still another object of this invention is to provide a radiator sight gauge which is readily installed in existing radiators from the outside through a single aperture.

To provide an improved sealing means in liquid level observation ports for thin wall vessels, is yet another object of this invention.

Also, to provide an improved sight gauge for liquid level which can be attached to hose connections, is another object of the invention.

To provide a hemispherical viewing port for determining the presence of liquid in a vessel which is visible through a wide angle, is still a further object of this invention.

Other objects and attendant advantages of this invention will become more readily apparent and understood from the following detailed specification and accompanying drawings in which:

FIG. 5 is a view similar to FIG. 1 showing various possible locations of sight gauges for existing radiators;

FIG. 6 is an exploded view of the elements of a fourth embodiment of a sight gauge of this invention shown installed in position in FIG. 7;

FIG. 7 is a vertical section taken on line 7—7 of FIG. 5;

FIG. 8 is a modification of the sight gauge of FIG. 7 showing the adaption of same to the hose connection of a radiator;

FIG. 9 is a simplified modification of the sight gauge of FIG. 7 for use on thin wall radiators where access to the interior is impossible.

Figure 1:
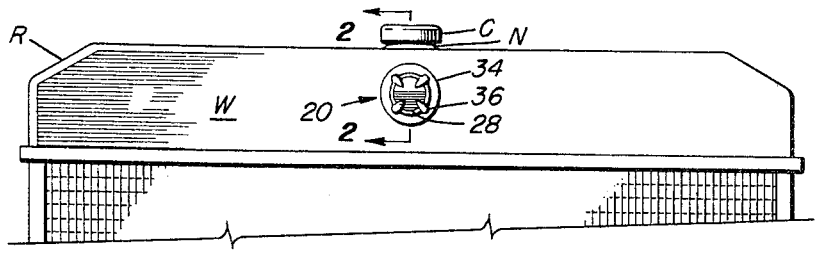
FIG. 1 is a fragmentary front elevation of an automotive vehicle radiator showing one embodiment of an improved sight gauge attached thereto and incorporating features of this invention.

Referring now to the details of the drawings, the preferred location of a radiator sight gauge is in the center of the upper front wall W of an otherwise conventional motor vehicle radiator R as shown in FIG. 1.

Figure 2:
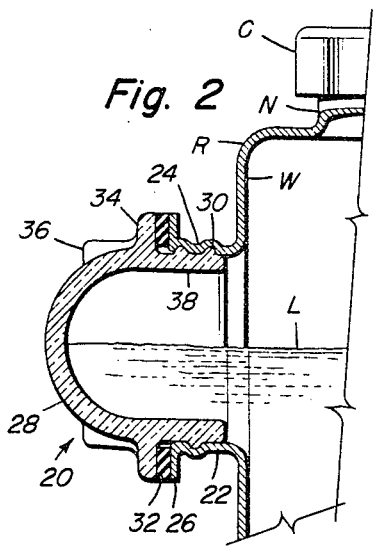
FIG. 2 is a cross-section, partly in elevation, taken along line 2—2 of FIG. 1 of the improved sight gauge of FIG. 1.

In the initial manufacture of a radiator R, it is possible to extrude a hole in the wall W at the desired location of a sight gauge 20 and form a nipple 22 as shown in FIG. 2. A rolled thread 24 is now formed in this nipple 22 and an outwardly extending end flange 26 is turned out at the ends.

In the first embodiment of the sight gauge 20, a hollow hemispherical glass or transparent plastic cap 28 is provided with a tubular neck 38. This neck 38 is provided with rounded threads 30 to match the threads 24 when inserted in the nipple 22.

The cap 28 has a flat closely fitted annular gasket 32 around the neck 38 which contacts the face of the flange 26 and the opposing face of a diametrical flange 34 formed around the cap 28. Ribs 36 are provided on the curved sides of the cap 28 so the latter may be tightened or removed with the fingers.

With this design of the sight gauge 20, it is obvious that the level of the liquid L is easily observed not only from a point normal to the wall W but from all angles up to 180° from normal.

Figure 3:
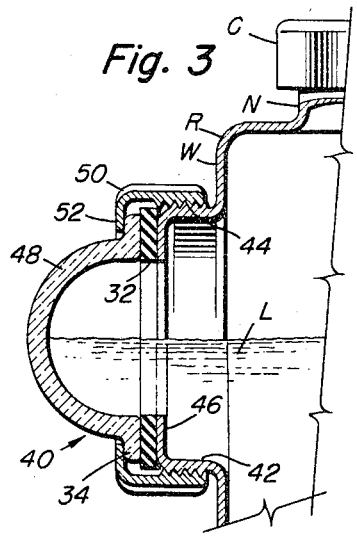
FIG. 3 is a cross-section similar to FIG. 2 of a second embodiment of the sight gauge of this invention.

In another or second embodiment of the sight gauge 40 as shown in FIG. 3, the wall W of the radiator R is apertured and a turned nipple 42 is soldered therein. This nipple 42 has externally chased threads 44 and an inwardly extending flange 46 on its end. The transparent cap 48 is hemispherical as in the previous embodiment of the sight gauge 20 but does not require the finger ribs 36. Instead ribs 50 are formed on the peripheral surface of a cylindrical bezel 52. A threaded tubular extension of the cap 48 is also not required because the bezel 52 is internally threaded and thus can be tightened on the nipple 42 to compress the annular gasket 32 between flanges 46 and 34.

Figure 4:
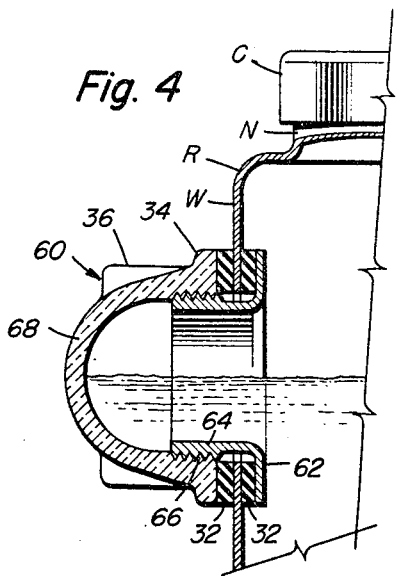
FIG. 4 is a cross-section similar to FIGS. 2 and 3 of a third embodiment of the invention.
Figure 10:
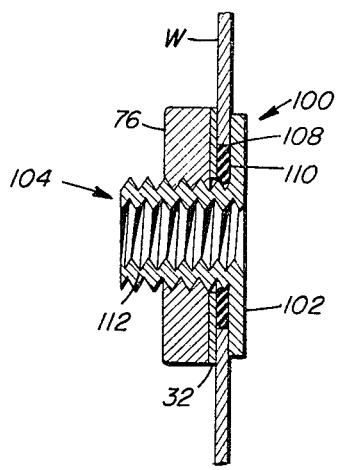
FIG. 10 is an enlarged detail view taken on line 10—10 of FIG. 5 illustrating an improved nipple in a sight gauge where the only possible access is from the front of the vessel.
Figure 11:
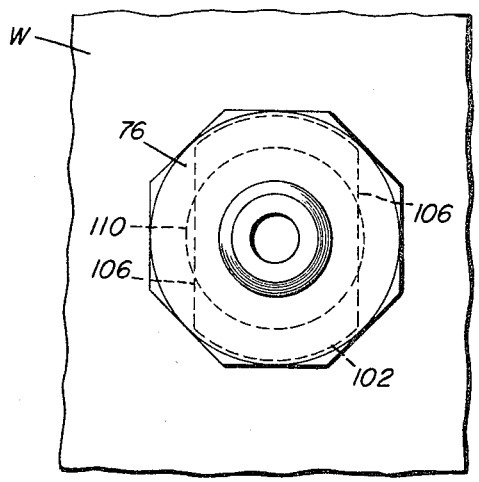
FIG. 11 is a detailed front view of FIG. 10.
Figure 12:
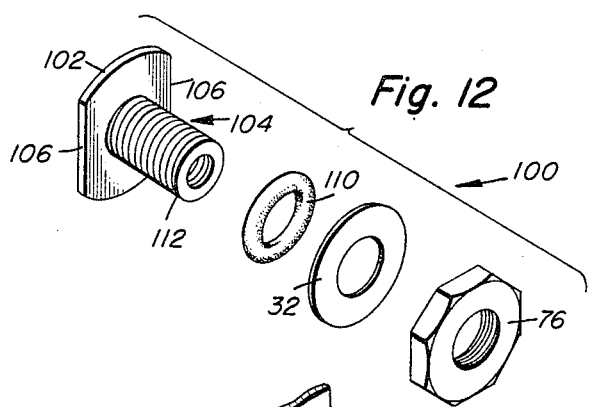
FIG. 12 is an exploded depiction of the elements of the sight gauge of FIGS. 10 and 11.

The embodiment of the sight gauge 60 shown in FIG. 4 is easily installed in a plain hole drilled in existing radiators R. To this end, there is provided an outwardly flanged thimble 62 having an externally threaded neck 64. Internal threads 66 are provided in the transparent hemispherical cap 68 to match.

The thimble 62 is installed with a flat annular gasket 32 thereon by manipulating the assembly through the opened neck N of the radiator cap C so that the neck 64 of the thimble 62 protrudes from the aforesaid drilled hole. Another annular gasket 32 is installed on the neck 64 and the cap 68 is screwed thereon and tightened by means of the finger ribs 36.

As shown for the embodiment of the sight gauge 70 in FIG. 6, a thimble 72 having both external and internal threads and a transparent cap 78 having external threads on its neck 79 may be employed. Instead of a flat gasket under the flange of the thimble 72, a resilient O-ring 74 is used, as best shown in FIG. 7. A nut 76 clamps the elements 72 and 74 to the wall W of the radiator R and permits the cap 78 to be removably installed without the entire assembly becoming disengaged. Another O-ring 74 is used for sealing behind the diametrical flange 34.

Another embodiment of sight gauge 80 may be derived from the preceding embodiment of the sight gauge 70 by forming a similar thimble 82 with an arcuate flange 84 as shown in FIG. 8. The nut 76 is backed up with an arcuate washer 86 for use on the usual hose coupling H of a radiator R if no other location for a sight gauge is available.

Some cases may require a gauge location other than central on the radiator R. These are illustrated at the right and left in FIG. 5 and it will be noted that access from the interior of the radiator R through the filler F is no longer possible in the installation procedure.

Accordingly, a "blind" installation embodiment of the sight gauge 90 is shown in FIG. 9. This sight gauge 90 merely involves the provision of an undersized aperture in the wall W of the radiator R and coarse pitch threads 92 on the neck 79 of the cap 78. No thimble or nut is used. Here, the cap 78 is self-threaded into the undersized aperture 94 and the thin metal of the radiator wall W distorts sufficiently to form a single thread to receive the threaded neck 79. The O-ring 74 cooperates with the diametrical flange 34 to form a seal.

If the wall W of the radiator is thick and unyielding, the embodiment of the sight gauge 100 as shown in FIGS. 10 to 14 inclusive is employed.

Figure 13:
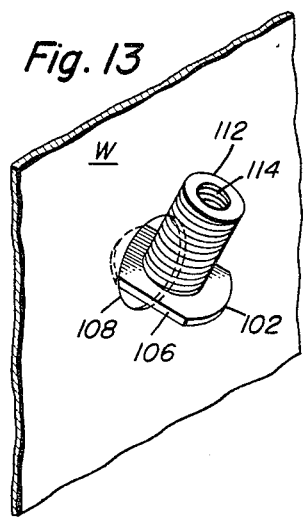
FIG. 13 illustrates the method of assembly of the nipple element of the sight gauge of FIGS. 11, 12 and 13 in aperture from the front of a vessel.

The "blind" installation is from the front of the radiator R despite the use of a thimble. This is accomplished by trimming opposite sides 106 of a flange 102 of an internally and externally threaded thimble 104 so that it can be passed through a drilled aperture 108 of the wall W of the radiator R as shown in FIG. 13. An O-ring 110 closely conforming to the diameter of the aperture 108 and somewhat thicker than the wall W of the radiator R is then slipped over the shank 112 of the thimble 104. A flat annular gasket 32 larger than the aperture 108 is next installed and the nut 76 is used to tighten the assembly.

Figure 14:
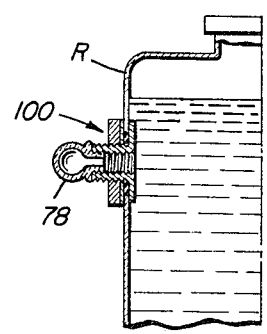
FIG. 14 depicts in cross-section the installed sight gauge of FIG. 12 on an automotive radiator.

A transparent cap 78 identical to transparent cap 78 of FIG. 6 with an O-ring 74 may then be installed as shown in FIG. 14, or, if preferred, the cap 78 may be of the internally threaded cap 68 of FIG. 4. In this case, the internal threads 114 of the thimble 104 are not required.

Obviously, many modifications and variations of the present invention may be made in light of the above teachings. It is, therefore, to be understood that within the scope of the appended claims the invention may be practiced otherwise than as specifically described.

What is claimed is:

1. A nipple assembly capable of being removably attached about an opening in a wall of a liquid container from the exterior of said container, said nipple assembly including a nipple having a body and an annular flange projecting radially outwardly from said body, said flange including first opposed edge portions of a diameter less than the diameter of said opening in said wall and second opposed edge portions of a diameter greater than the diameter of said opening in said wall, whereby said flange may be passed through said opening in said wall from the exterior of said container by positioning said first opposed edge portions adjacent opposed edge portions of said opening in said wall, means for removably securing said nipple body in said opening and extending exteriorly of said container and with the portions of said flange adjacent said second opposed edge portions of said flange bearing against the surface of said wall adjacent said opening and defining an annular space between said body and said edge of said opening, resilient sealing means in said annular space, means for compressing said sealing means against said flange to cause it to bulge and bear against said edge of said wall defining said opening and said surface of said body, and transparent cap means in threaded engagement with said nipple body for showing the presence of liquid in said nipple body and thereby in said container.

2. A sight gauge for indicating the level of a fluid in a structural system having a wall for containing said fluid, comprising, a nipple arranged to extend through an opening in said wall and having a radial flange adjacent said wall and interiorly of said system, first means positioned in sealing relationship between said wall and said radial flange, nut means in threaded engagement with said nipple exteriorly of said system to secure said nipple thereto, a hemispherical transparent cap having an annular peripheral flange extending transversely from the longitudinal direction thereof, engageable thread means on said cap and nipple for securing said cap to said nipple, and second means positioned in sealing relationship between said annular peripheral flange of said cap and the exterior end of said nipple, said cap being hollow for permitting entry of said fluid from said system into said cap for visually indicating the presence of said fluid in said system.

References Cited by the Examiner

UNITED STATES PATENTS

| 735,078 | 10/1903 | Felsing et al. | 285—200 X |
|---|---|---|---|
| 2,611,481 | 9/1952 | Sargeant et al. | 220—82 X |
| 2,647,406 | 8/1953 | Sorensen | 73—334 |
| 2,662,405 | 12/1953 | Tapscott | 73—328 |
| 2,917,924 | 12/1959 | Messick | 73—334 |

FOREIGN PATENTS

| 167,827 | 6/1956 | Australia. |
|---|---|---|
| 275,467 | 6/1914 | Germany. |
| 576,676 | 5/1958 | Italy. |

LOUIS R. PRINCE, *Primary Examiner.*

DONN McGIEHAN, *Assistant Examiner.*